(12) United States Patent
Eakin

(10) Patent No.: US 11,209,302 B1
(45) Date of Patent: Dec. 28, 2021

(54) SYSTEM WITH VERTICAL CABLE AND DRAG ELEMENTS FOR MEASURING LEVEL OF DRY BULK MATERIAL IN CONTAINER

(71) Applicant: Osborne Industries, Inc., Osborne, KS (US)

(72) Inventor: George R Eakin, Osborne, KS (US)

(73) Assignee: Osborne Industries Inc., Osborne, KS (US)

( * ) Notice: Subject to any disclaimer, the term of this patent is extended or adjusted under 35 U.S.C. 154(b) by 0 days.

(21) Appl. No.: 17/066,377

(22) Filed: Oct. 8, 2020

(51) Int. Cl.
  *G01F 23/20* (2006.01)

(52) U.S. Cl.
  CPC ................... *G01F 23/205* (2013.01)

(58) Field of Classification Search
  CPC ............................ G01F 23/20; G01F 23/205
  See application file for complete search history.

(56) References Cited

U.S. PATENT DOCUMENTS

| | | | | |
|---|---|---|---|---|
| 3,500,546 A * | 3/1970 | Pilcher | ................ | G01F 23/0023 33/715 |
| 3,542,982 A * | 11/1970 | Gruber | ................ | G01F 23/226 200/61.21 |
| 3,721,971 A * | 3/1973 | Gruber | ................ | G01F 23/226 307/116 |
| 3,933,041 A * | 1/1976 | Hyer | ................ | G01F 23/00 73/290 R |
| 4,188,726 A * | 2/1980 | Wemyss | ................ | G01F 23/00 33/715 |
| 4,219,133 A * | 8/1980 | Sinsky | ................ | G01F 23/0023 222/39 |
| 4,276,774 A * | 7/1981 | McGookin | ................ | G01F 23/20 73/290 B |
| 4,312,225 A * | 1/1982 | Williams | ................ | H01H 17/12 340/617 |
| 4,375,020 A * | 2/1983 | Holterbosch | ................ | G01F 23/226 200/61.21 |
| 4,676,099 A * | 6/1987 | McGookin | ................ | G01F 23/0038 248/317 |
| 4,910,878 A * | 3/1990 | Fleckenstein | ................ | G01F 23/0023 318/482 |
| 6,003,366 A * | 12/1999 | McGookin | ................ | G01F 23/0023 73/296 |
| 6,732,580 B2 * | 5/2004 | Dirksen | ................ | G01F 23/0023 73/149 |

(Continued)

*Primary Examiner* — John Fitzgerald
(74) *Attorney, Agent, or Firm* — Jeffrey L. Thompson; Thompson Law, P.A.

(57) ABSTRACT

A system for measuring a level of dry bulk material within a container has at least one vertical cable with a plurality of drag elements supported at spaced locations along a length of the cable. The drag elements each have at least one opening through which the cable extends. The vertical cable can be a single cable extending through the center of the drag elements, or multiple cables extending through spaced apart openings in the drag elements. A load cell is arranged to measure a cumulative weight of the cable and drag elements plus the downward force applied by the dry bulk material to the drag elements to provide a load cell signal proportional to the level of dry bulk material in the container. The drag elements can be provided in various shapes and configurations, including circular disks or cap-shaped elements having substantially flat horizontal upper surfaces.

25 Claims, 6 Drawing Sheets

(56) References Cited

U.S. PATENT DOCUMENTS

| | | | |
|---|---|---|---|
| 7,579,564 B2* | 8/2009 | Henderson | G01L 5/00 |
| | | | 200/61.2 |
| 8,531,304 B2* | 9/2013 | Thibault | G01F 23/24 |
| | | | 340/614 |
| 9,360,360 B2* | 6/2016 | Eakin | G01G 23/012 |
| 2008/0092802 A1* | 4/2008 | Henderson | G01L 5/00 |
| | | | 116/212 |

* cited by examiner

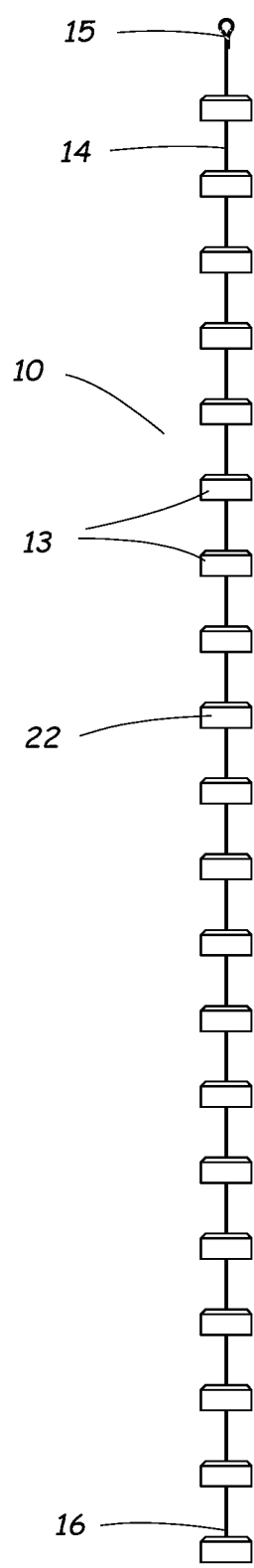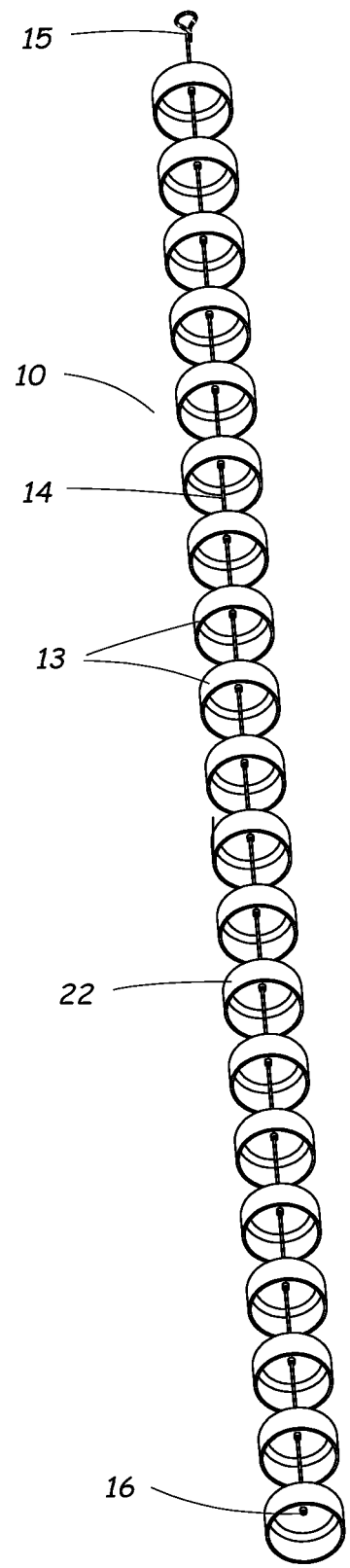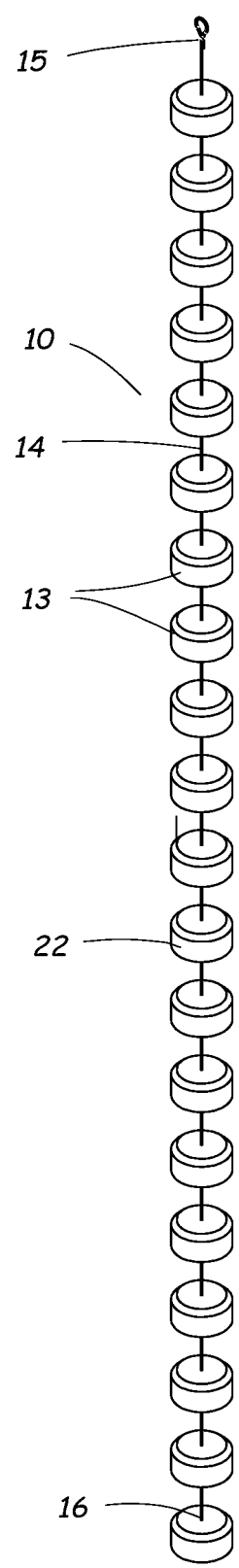

Fig. 14
Fig. 15
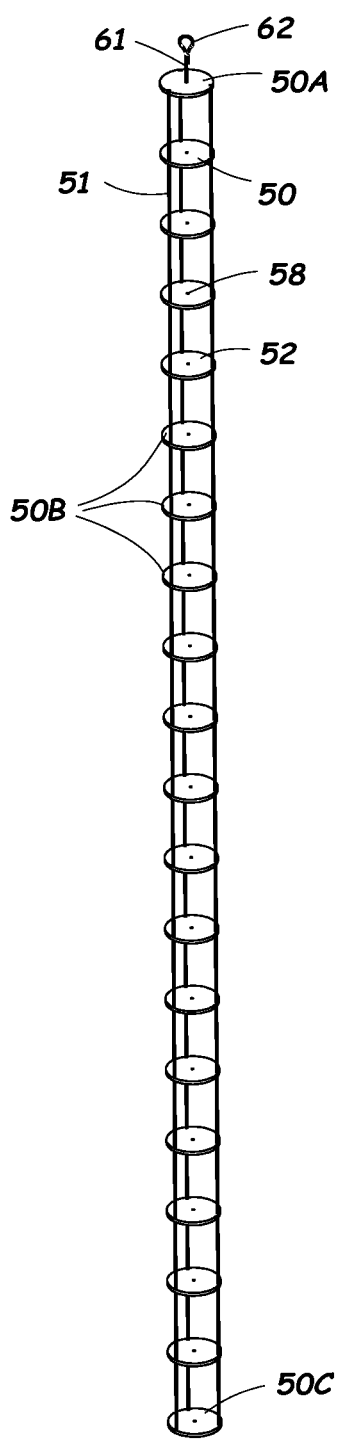
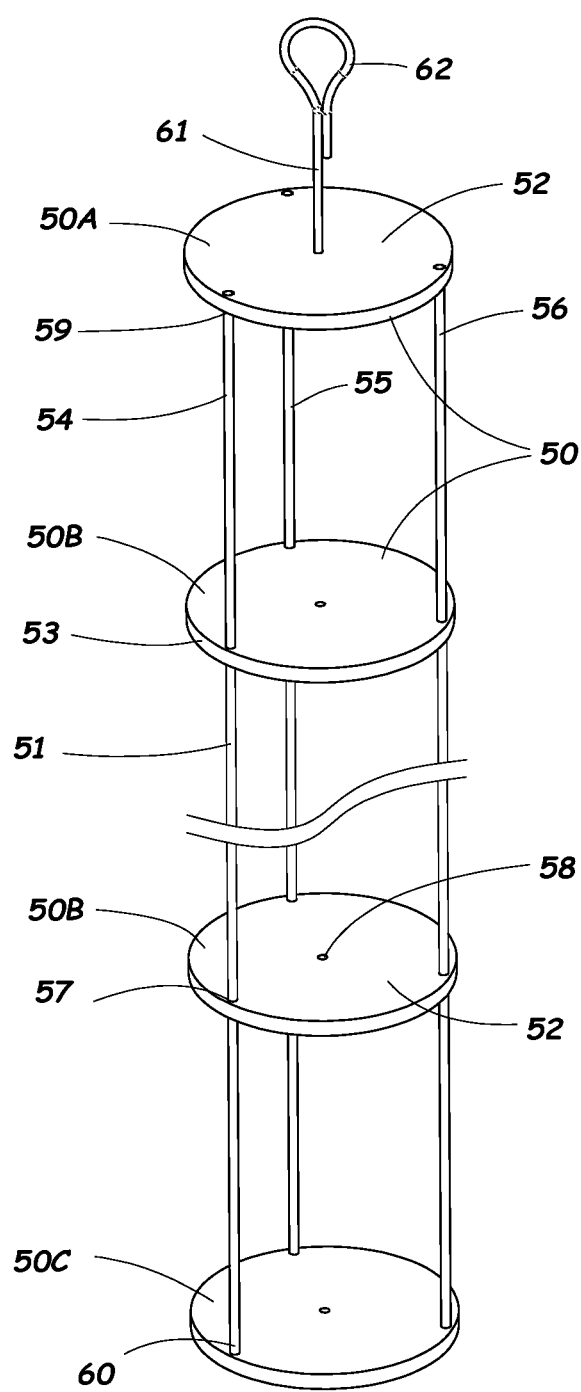

SYSTEM WITH VERTICAL CABLE AND DRAG ELEMENTS FOR MEASURING LEVEL OF DRY BULK MATERIAL IN CONTAINER

BACKGROUND OF THE INVENTION

Field of the Invention

The present invention relates generally to devices for measuring the depth of material in containers. In particular, the present invention relates to devices and methods for measuring the depth of dry bulk particulate materials, such as livestock feed, in a container, such as a feed bin or grain bin.

Description of the Related Art

An ability to measure the level and amount of a dry bulk solid material in a container is often needed to know the rate of use or disappearance of material from the container so that rate of material use can be accurately established to enable the user to monitor and control the use of the material being withdrawn from the container and to know when to restock the container with the material after it is predicted to be depleted. The inventory volume of a given container is also useful in determining the value of material in the container. Such measuring devices can also be used to alert an operator to avoid overfilling the container and to monitor the refilling operation to ensure that the container is totally filled, but not overfilled. Measuring devices for bulk material are particularly useful for agricultural livestock feed bins, which are frequently discharged and recharged with feed.

There are several examples in the prior art of bin level measuring devices. For example, the Applicant's prior U.S. Pat. No. 8,531,304 issued to Thibault discloses a bin level monitoring system that uses resistive elements that are arranged to be moved into contact with each other when pressure is applied by the bulk material. A measure of the material level in the bin is provided by sensing a change in resistance of the electric circuit connected to the resistive elements.

Applicant's prior U.S. Pat. No. 9,360,360 issued to Eakin discloses a system for measuring a level of bulk material in a container that uses a columnar device supported vertically within the container. The columnar device has a closed lower end and openings through a sidewall for allowing dry bulk material within the container to flow into and out of the columnar device. A load cell is used to measure a weight of the dry bulk material within the columnar device to provide a measurement of the material level in the container.

U.S. Pat. No. 6,732,580 issued to Dirksen shows a load cell that monitors the weight of a suspended cable within a silo. The cable is fitted with a terminal weight to increase the sensitivity of the cable/weight assembly. In practice, this system was found to be unreliable and relatively insensitive to low-density feeds.

SUMMARY OF THE INVENTION

An object of the present invention is to provide a system for measuring a level of dry bulk material in a container, which is accurate, inexpensive, simple in operation, durable, reliable in harsh usage environments, does not have moving parts subject to wear and damage, is not affected by temperature changes unrelated to material level, and is capable of a long operating life.

To accomplish these and other objects of the present invention, a system for measuring a level of dry bulk material within a container has at least one vertical cable with a plurality of drag elements supported at spaced locations along a length of the cable. The drag elements each have at least one opening through which the cable extends. The vertical cable can be a single cable extending through the center of the drag elements, or multiple cables extending through spaced apart openings in the drag elements. A load cell is arranged to measure a cumulative weight of the cable and drag elements plus the downward force applied by the dry bulk material to the drag elements to provide a load cell signal proportional to the level of dry bulk material in the container. The drag elements can be provided in various shapes and configurations, including circular disks or cap-shaped elements having substantially flat horizontal upper surfaces.

According to one aspect of the present invention, a system for measuring a level of dry bulk material in a container is provided, comprising: at least one cable having an upper end and a lower end and adapted to be supported vertically within the container so as to be surrounded by the dry bulk material within the container; a plurality of drag elements supported by the at least one cable at spaced locations between the upper and lower ends of the cable, the drag elements each having a center and an effective radius; and a load cell associated with the cable. The load cell is arranged to measure a cumulative weight of the cable and drag elements plus the downward force applied by the dry bulk material in the container to the drag elements to provide a load cell output signal proportional to the level of dry bulk material in the container.

According to another aspect of the present invention, a system for measuring a level of dry bulk material in a container is provided, comprising: at least one cable having an upper end and a lower end and adapted to be supported vertically within the container so as to be surrounded by the dry bulk material within the container; a plurality of drag elements supported by the at least one cable at spaced locations between the upper and lower ends of the cable, the drag elements each having a circular shape with a center and a radius from the center to an outer periphery of the circular shape; and a load cell associated with the cable. The load cell is arranged to measure a cumulative weight of the at least one cable and the drag elements plus the downward force applied by the dry bulk material in the container to the drag elements to provide a load cell output signal proportional to the level of dry bulk material in the container.

Numerous other objects of the present invention will be apparent to those skilled in this art from the following description wherein there is shown and described embodiments of the present invention, simply by way of illustration of some of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF DRAWINGS

The present invention will become more clearly appreciated as the disclosure of the present invention is made with reference to the accompanying drawings. In the drawings:

FIG. 4 is an elevation view of a vertical cable with a plurality of drag elements for the monitoring system shown in FIG. 1.

FIG. 5 is a bottom perspective view of the vertical cable and drag elements shown in FIG. 4.

FIG. 6 is a top perspective view of the vertical cable and drag elements shown in FIG. 4.

FIG. 14 is a top perspective view of a cage-type structure used to support flat disk-shaped drag elements in a monitoring system according to a third embodiment of the present invention.

FIG. 15 is an enlarged perspective view of the cage-type structure and drag elements shown in FIG. 14.

DETAILED DESCRIPTION OF THE INVENTION

Figure 1:
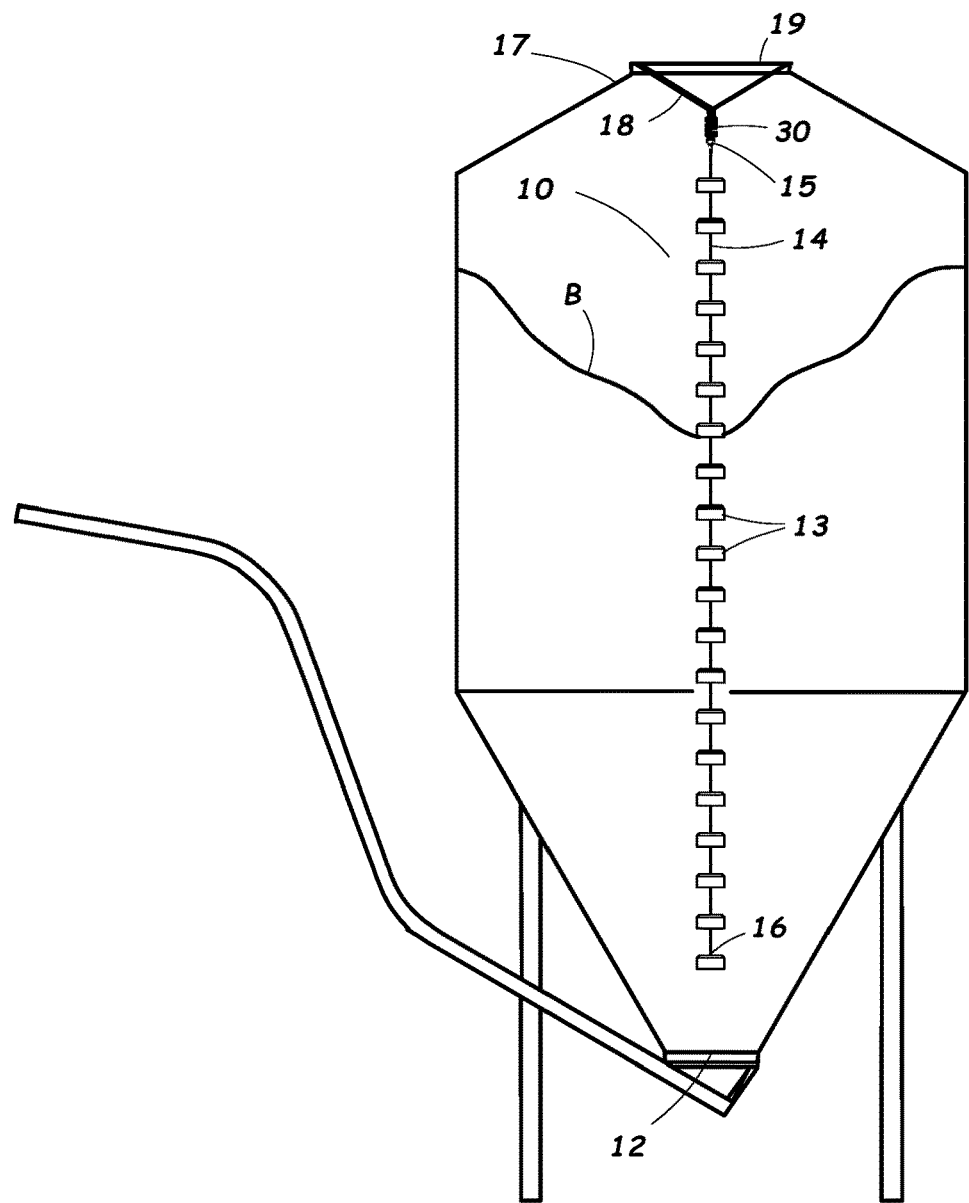
FIG. 1 is an elevation view of a dry bulk container, such as a feed bin, equipped with a monitoring system according to a first embodiment of the present invention.
Figure 2:
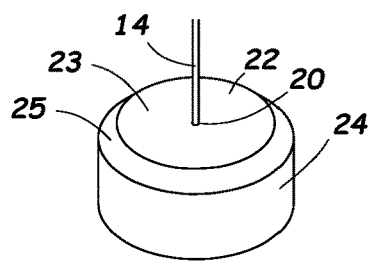
FIG. 2 is a top perspective view of a cap-shaped member used as a drag element in the first embodiment of the present invention.
Figure 3:
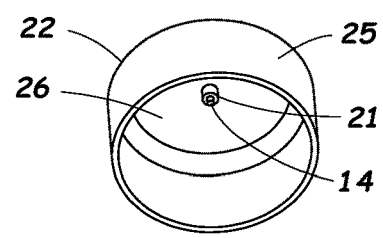
FIG. 3 is a bottom perspective view of the cap-shaped member shown in FIG. 2.
Figure 7:
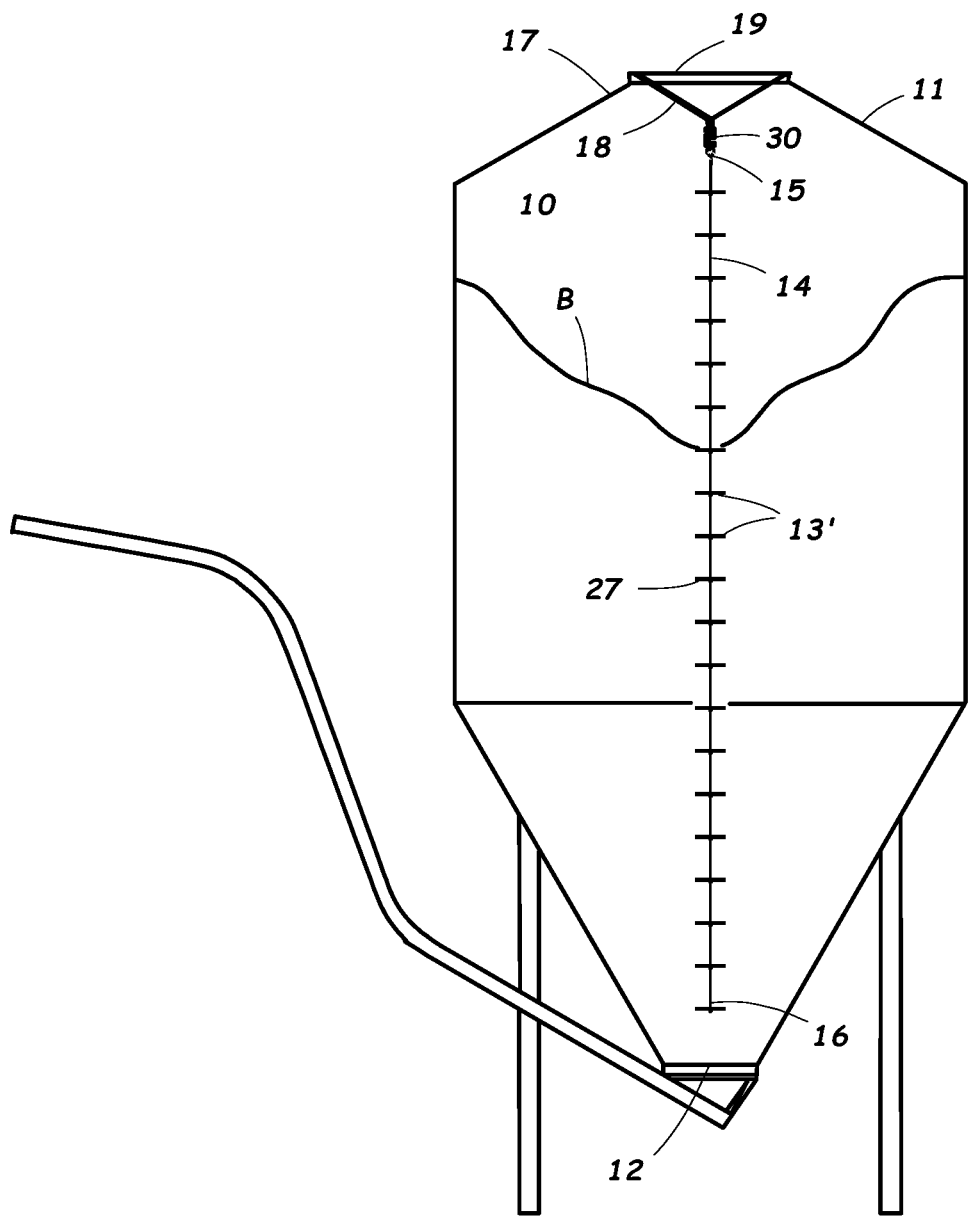
FIG. 7 is an elevation view of a dry bulk container, such as a feed bin, equipped with a monitoring system according to a second embodiment of the present invention.
Figure 8:
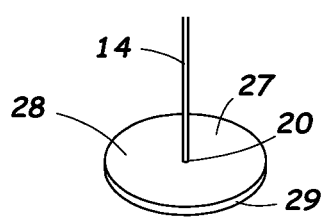
FIG. 8 is a top perspective view of a flat disk-shaped member used as a drag element in the second embodiment of the present invention.
Figure 9:
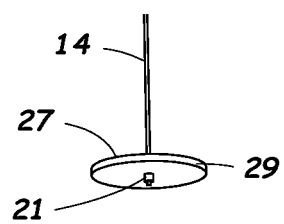
FIG. 9 is a bottom perspective view of the disk-shaped member shown in FIG. 8.
Figure 10:
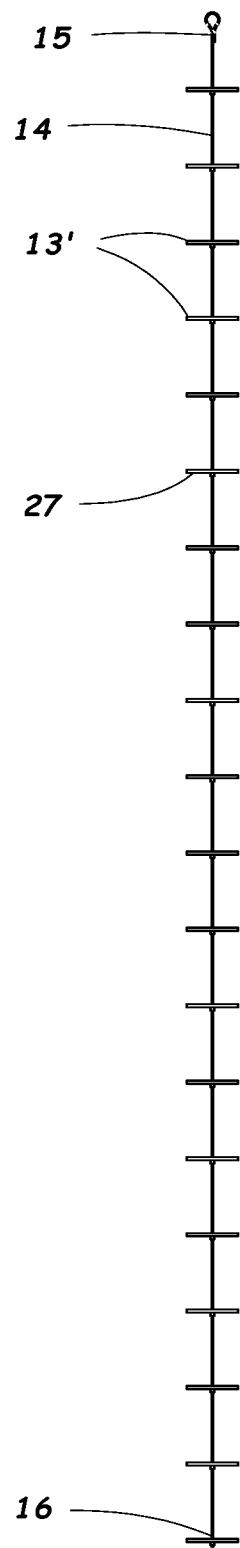
FIG. 10 is an elevation view of a vertical cable with a plurality of drag elements for the monitoring system shown in FIG. 7.
Figure 11:
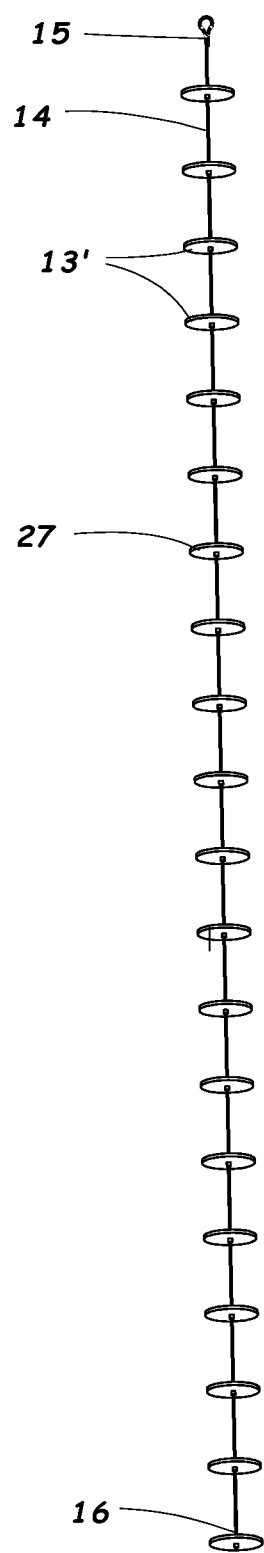
FIG. 11 is a bottom perspective view of the vertical cable and drag elements shown in FIG. 10.
Figure 12:
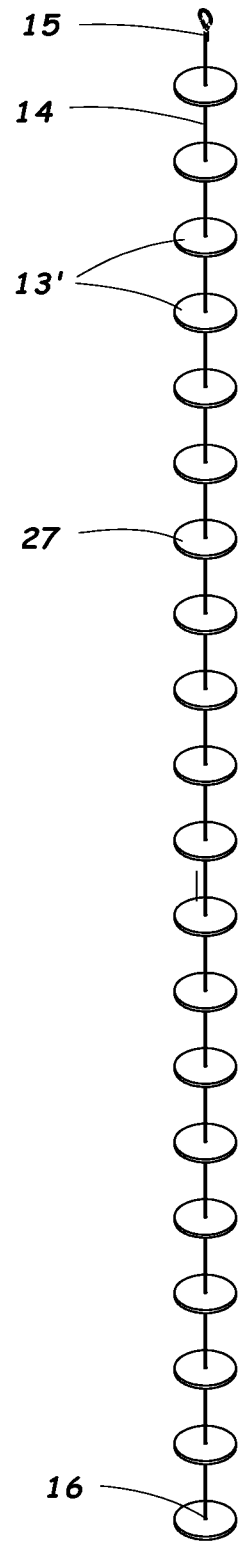
FIG. 12 is a top perspective view of the vertical cable and drag elements shown in FIG. 10.

A bin level monitoring system 10 according to the present invention will now be described with reference to FIGS. 1 to 15 of the accompanying drawings.

The present invention uses some of the same concepts found in the Applicant's prior U.S. Pat. No. 9,360,360 with respect to the flow characteristics of dry bulk materials B stored and removed from containers 11, such as a silos, bins, or other storage structures. As dry bulk materials B flow through a dry bulk storage container 11, the internal flow forces of the material equilibrate to a certain level dependent upon the storage structure geometry, particulate size and shape, moisture content, and angle of repose. The resulting internal forces are equalized to a level that allows the feed to cave off and flow down through the storage structure towards the outlet 12.

The present invention removes and/or minimizes these variables by providing drag elements 13 at vertically spaced locations within the container 11 and measuring the downward forces applied by the dry bulk material B to the drag elements 13.

The system 10 for measuring a level of dry bulk material B in a container 11 according to the present invention includes a vertical cable 14 having an upper end 15 and a lower end 16. The cable 14 has a loop or other suitable structure at its upper end 15 to facilitate hanging the cable 14 from the roof or ceiling 17 of the container 11. For example, the cable 14 can be hung from a hanging bracket 18 attached to the rim 19 of the center opening in the roof 17 of the container 11, as illustrated in FIG. 1. The cable 14 is supported vertically within the container 11 so as to be surrounded by the dry bulk material B within the container 11 when the container 11 is filled, and to be gradually exposed as the container 11 is emptied. In the illustrated embodiment, the cable 14 is supported from the roof 17 directly above the center outlet 12 at the bottom of the container 11 and extends downwardly to a point near the bottom of the container 11.

A plurality of drag elements 13 are supported by the cable 14 at spaced locations between the upper and lower ends 15, 16 of the cable 14. The drag elements 13 each have a center opening 20 through which the cable 14 extends. A plurality of support members 21 are secured to the cable 14 at spaced locations between the upper and lower ends 15, 16 of the cable 14 for engaging and supporting the drag elements 13 at the spaced locations along the length of the cable 14. The support members 21 can be, for example, cable stops that are crimped or clamped to the cable 14.

The drag elements 13 shown in FIGS. 1 to 6 are cap-shaped members 22 each having a planar upper surface 23 and a cylindrical sidewall 24. A beveled transition area 25 is provided between the planar upper surface 23 and the cylindrical sidewall 24. The cap-shaped members 22 each have a hollow interior 26 defined by the planar upper surface 23, the cylindrical sidewall 24, and an open bottom side.

The drag elements 13' shown in FIGS. 7 to 12 are circular disks 27 each having a planar upper surface 28 and an outer peripheral edge 29.

A load cell 30 is provided at the top of the cable 14 to measure a cumulative weight of the cable 14 and drag elements 13, 13' plus the downward force applied by the dry bulk material B in the container 11 to the cable 14 and drag elements 13, 13'. The load cell 30 is suspended by the hanging bracket 18 fastened to the rim 19 of the top access opening of the bulk storage container 11 or other suitable structure near the top of the container 11. The load cell 30 can be a tension load cell attached to the hanging bracket 18 at the top of the container 11. The loop or other structure at the top of the cable 14 can be attached to the load cell 30 using a hook or other suitable structure so that the cable 14 is suspended directly from the load cell 30. The load cell 30 can be positioned above and outside of the dry bulk material B and easily accessible for service from the fill access opening of the storage container 11.

The load cell 30 provides a load cell output signal proportional to the level of dry bulk material B in the container 11. The load cell 30 can be positioned close to a transmitter or other means for communicating the output signal to the main interface computer or display of the monitoring system. The communication means can be achieved by wireless communication, hard wiring, or other techniques that enable the output signal to be transmitted to the user. The transmitted output signal is then received by a receiver that converts the information into something useful for the manager, operator, or producer.

The planar upper surfaces 23, 28 of the drag elements 13, 13' (both the cap-shaped members 22 and the circular disks 27) in the illustrated embodiments are substantially flat horizontal surfaces on which the bulk material B is captured to cause a downward force on the load cell 30. It is contemplated that drag elements having other shapes and configurations can be used in the present invention, as long as the drag elements have a shape that drags on the bulk material B to cause a downward force on the load cell 30. Drag elements having rounded or curved surfaces, such as spherical members, can also be used, although such curved surfaces will have a tendency to reduce drag and may result in less measurable force on the load cell 30.

The drag elements 13, 13' each have an effective radius defined as an average horizontal distance from the cable 14 to an outer periphery of the drag element 13, 13'. In the case of the drag elements 13 having the form of the cap-shaped members 22 shown in FIGS. 1 to 6, the effective radius of the drag elements 13 is the distance from the cable 14 to the outer surface of the cylindrical sidewall 14. In the case of the drag elements 13' having the form of the circular disks 27 shown in FIGS. 7 to 12, the effective radius of the drag elements 13 is the distance from the cable 14 to the outer peripheral edge 29 of the circular shape.

The measuring system 10 of the present invention uses a spacing between drag elements 13, 13' that provides a sufficient fidelity or resolution of the measuring system, while allowing the bulk material B to build on the surface during filling and to be relieved when emptying. In practice, it has been determined that a maximum spacing between adjacent drag elements 13, 13' should be less than eight times the effective radius of the drag elements 13, 13' to provide a suitable fidelity or resolution for the measuring system. If the drag elements 13, 13' are spaced apart more than eight times the effective radius, the measuring system will not be as useful or precise in determining when the material level in the container 11 has reached a different level. If the spacing between drag elements 13, 13' is too large, the drag or fidelity of the system will be adversely affected.

A minimum spacing between adjacent drag elements 13, 13' can be determined based on the effective radius of the drag elements 13, 13' and the angle of repose of the dry bulk material B in the container 11. For example, a narrower spacing between drag elements 13, 13' can be used when the dry bulk material B has a lower angle of repose (indicating a more flowable material), and a larger spacing between drag elements 13, 13' can be used when the dry bulk material B has a higher angle of repose.

A narrower spacing between drag elements 13, 13' can also be used with drag elements having a smaller effective radius. In this case, the drag elements 13, 13' can be placed closer together because a smaller spacing is required for the bulk material B to flow inwardly from the outer edges of the drag elements 13, 13' to the cable 14. A suitable minimum spacing can be found by multiplying the effective radius of the drag element 13, 13' by the tangent of the angle of repose of the bulk material. For example, if the radius of the drag element is 6 inches and the angle of repose is 40 degrees, a suitable minimum spacing between facing surfaces of the adjacent drag elements 13, 13' would be approximately 5 inches. The drag elements 13, 13' can be spaced closer together than the calculated suitable minimum spacing without gaining an improvement in performance.

In the illustrated embodiments, there are approximately 20 drag elements 13, 13' spaced along the length of the vertical cable 14. This number of drag elements 13, 13' has been demonstrated as providing a suitable monitoring system for a conventional feed bin in a livestock feeding operation. However, it is contemplated that a greater or smaller number of drag elements 13, 13' could be used to accomplish the objectives of the present invention. For example, a monitoring system with only three drag elements 13, 13' spaced equidistant along a length of the cable 14 could be used to monitor when the bulk material level reaches three different levels (e.g., one-fourth, one-half, and three-fourths). For another example, a monitoring system with five drag elements 13, 13' spaced equidistant along a length of the cable 14 could be used to monitor when the bulk material level reaches five different levels. It will be appreciated that the more drag elements 13, 13' are attached to the cable 14, the more accurately the load cell readings will correspond to the levels of bulk material B in the container 11.

The radius of the drag elements 13, 13' in the illustrated embodiments is approximately 2 to 4% of the diameter of the feed bin 11. For example, a 20 foot diameter feed bin could be provided with a monitoring system having drag elements 13, 13' with a radius of approximately 6 inches. This has been demonstrated as providing a suitable size for the drag elements 13, 13' to monitor the level of bulk material B in the feed bin 11 without interfering with the loading, capacity or unloading of the feed bin 11. It is contemplated that drag elements 13, 13' having a radius of up to approximately 25% of the diameter of the feed bin 11 could be used in the present invention, although some effect on the loading, capacity and/or unloading of the feed bin 11 may result when using a monitoring system with larger drag elements 13, 13'.

The vertical cable 14 can be a single continuous, multi strand wire rope, or it can be assembled from subsections that are connected together end-to-end using suitable connections. The vertical cable can also be a rigid metal rod with welded connections between the rod and the supports, or the drag elements can be welded directly to the metal rods. The term "cable" in this application is intended to include wire rope, metal rods, and other functionally equivalent elements that have high tensile strength. The final deployed length of the vertical cable 14 can be made to match the total depth of the bulk material B in a storage structure of any height. The system can also be combined as two or more monitors connected together to sample and report depths as an average of a number of locally variable depths in a storage container. The system can also be combined in a triangular array to measure material level in three locations within a storage container and to measure a wider range of material levels for better accuracy.

Testing of the monitoring system of the present invention shows that there is a linear characteristic between the feed level in the storage container 11 and the force measured by the load cell 30. The testing demonstrates that there is good correlation of the data when bulk feed is loaded and unloaded from the storage container 11. The invention removes the outside influences owing to the dry bulk material flow conditions, and provides an inexpensive, simple and durable means of correlating the down force on the vertical cable 14 to the height level of material B inside the storage container 11.

The dry bulk storage container 11, such as a feed bin in this explanation, is positioned in a location such that the dry bulk material B contained inside can be transferred to the location where it will be used. This transferring of the dry bulk material B is typically done by using a mechanical auger, pneumatic flow, or cable type conveying system. The vertical cable 14 is suspended by a load cell 30 that measures the downforce imparted to the drag elements 13, 13' and the vertical cable 14 throughout the entire process of filling and emptying the dry bulk material B in the container 11. The vertical cable 14 can be located in the center of the container 11 directly above the outlet 12 of the container 11 to provide a better measurement of the material height within the container as the bulk material B is emptied from the container 11. However, the vertical cable 14 can be mounted in other locations as needed.

Figure 13:
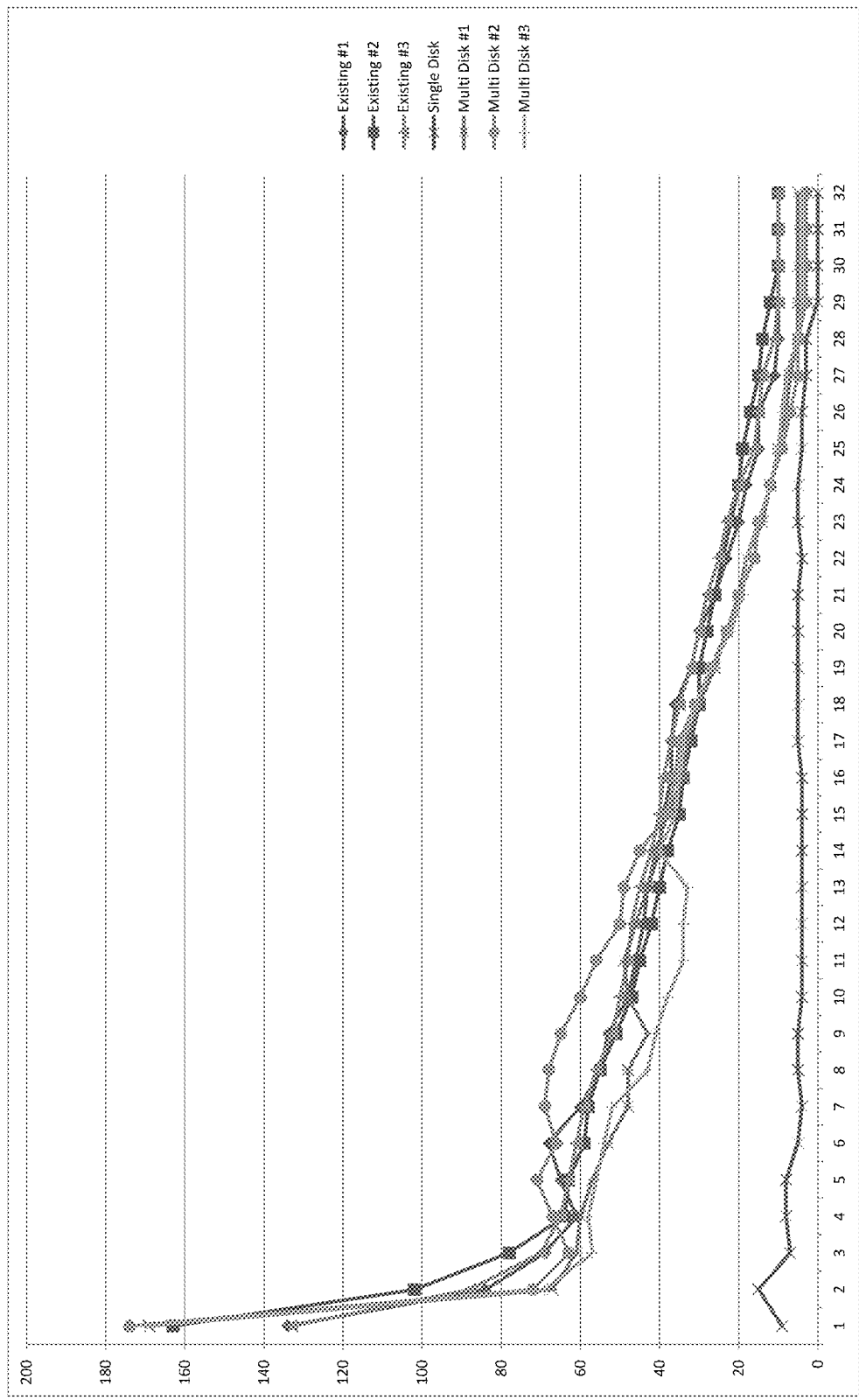
FIG. 13 is a line graph showing the relationship between a load cell weight measurement and feed level height using conventional bin level monitoring systems and the bin level monitoring system of the present invention.

FIG. 13 is a line graph showing the relationship between a load cell weight measurement and feed level height using various bin level monitoring systems. The lines labeled Existing #1, Existing #2, and Existing #3 are for variations of the bin level monitoring system disclosed in Applicant's U.S. Pat. No. 9,360,360. The lines labeled Multi Disk #1, Multi Disk #2, and Multi Disk #3 are for variations of the bin level monitoring system of the present invention. The line labeled Single Disk is for a bin level monitoring system with a single disk attached to a vertical cable, which generally corresponds to the level sensor disclosed in U.S. Pat. No. 6,732,580 (Dirksen).

As indicated in FIG. 13, the load cell weight measurement has a high correlation with the feed level height for the bin level monitoring systems of the present invention and those disclosed in the '360 patent. However, there is low correlation or essentially a flat line for a monitoring system that uses a single disk attached to a vertical cable, as in Dirksen's '580 patent.

FIGS. 14 and 15 illustrate a third embodiment of the present invention in which drag elements 50 are supported at vertically spaced locations using a cage-type support structure 51. The drag elements 50 shown in FIGS. 14 and 15 are circular disks each having a planar upper surface 52 and an outer peripheral edge 53. The cage-type support structure 51 includes a plurality of vertical cables 54, 55, 56 that extend through mounting holes 57 near the outer peripheral edges 53 of the circular disks 50. The mounting holes 57 in each circular disk 50 can be spaced equidistant from each other and from the center 58 of the circular disk 50 to evenly distribute the load carried by the circular disks 50 and the vertical cables 54-56. For example, the illustrated cage-type support structure 51 has three such vertical cables 54-56 that extend from the top circular disk 50A through the mounting holes 57 in the intermediate circular disks 50B to the bottom circular disk 50C.

A plurality of support members (not shown in FIGS. 14 and 15) are secured to the vertical cables 54-56 at spaced locations between the upper end 59 and lower end 60 of each of the cables 54-56 for engaging and supporting the drag elements 50 at the spaced locations along the length of the vertical cables 54-56. The support members can be, for example, cable stops that are crimped or clamped to the vertical cables 54-56.

The drag elements 50 shown in FIGS. 14 and 15 also include center openings 58 in addition to the mounting openings 57 located near the outer periphery 53 of the drag elements 50. The center openings 58 can be used to accommodate a center vertical cable (not shown in FIGS. 14 and 15) extending from the top circular disk 50A through the intermediate circular disks 50B to the bottom circular disk 50C. Support members, such as cable stops, can be crimped or clamped to the center vertical cable to support the center of the circular disks 50.

A center vertical cable 61 extends from the center of the top circular disk 50A and has a loop 62 or other suitable structure at its upper end to facilitate hanging the device from the roof or ceiling 17 of the container 11. For example, the loop 62 of the cable 61 can be hung from a hanging bracket 18 attached to the rim 19 of the center opening in the roof 17 of the container 11, as in the other embodiments described herein and illustrated in FIG. 1. The cable 61 is supported vertically within the container 11 so that the cage-type support structure 51 is surrounded by the dry bulk material B within the container 11 when the container 11 is filled, and so that the cage-type support structure 51 and the drag elements 50 are gradually exposed as the container 11 is emptied.

As in the other embodiments described herein, a load cell can be provided at the top of the center vertical cable 61 to measure a cumulative weight of the vertical cables 54-56 and the drag elements 50, plus the downward force applied by the dry bulk material B in the container 11 to the cable 54-56 and drag elements 50. The load cell can be suspended by the hanging bracket 18 fastened to the rim 19 of the top access opening of the bulk storage container 11 or other suitable structure near the top of the container 11

The drag elements 50 each have an effective radius defined as an average horizontal distance from the center of the drag elements 50 to the outer periphery 53 of the drag elements 50. In the case of the drag elements 50 having the form of the circular disks shown in FIGS. 14 and 15, the effective radius of the drag elements 50 is the radius of the circular disks 50.

While the invention has been described in connection with specific embodiments thereof, it is to be understood that this is by way of illustration and not of limitation, and the scope of the appended claims should be construed as broadly as the prior art will permit.

What is claimed is:

1. A system for measuring a level of dry bulk material in a container, comprising:
   at least one cable having an upper end and a lower end and adapted to be supported vertically within the container so as to be surrounded by the dry bulk material within the container;
   a plurality of drag elements supported by said at least one cable at spaced locations between the upper and lower ends of said at least one cable, said drag elements each having a center, an outer periphery and an effective radius; and
   a load cell associated with said at least one cable, said load cell being arranged to measure a cumulative weight of said at least one cable and said drag elements plus the downward force applied by the dry bulk material in the container to the drag elements to provide a load cell output signal proportional to the level of dry bulk material in the container.

2. The system according to claim 1, wherein a spacing between adjacent drag elements is less than eight times said effective radius.

3. The system according to claim 1, wherein said drag elements each have a substantially flat horizontal surface on which said bulk material is captured to cause a downward force on the load cell.

4. The system according to claim 1, wherein said plurality of drag elements comprises at least three drag elements that are spaced equidistant along a length of said at least one cable between the upper and lower ends of said at least one cable.

5. The system according to claim 1, wherein said at least one cable comprises a plurality of vertical cables, and said drag elements each have a plurality of openings spaced from each other through which said plurality of vertical cables extend to support said drag elements at said spaced locations.

6. The system according to claim 1, wherein said load cell is a tension load cell, and wherein said at least one cable is hung from said load cell.

7. The system according to claim 1, wherein said dry bulk material has an angle of repose, and wherein a spacing between adjacent drag elements is greater than said effective radius multiplied by the tangent of said angle of repose.

8. The system according to claim 7, wherein said spacing between adjacent drag elements is less than eight times said effective radius.

9. The system according to claim 1, wherein said plurality of drag elements comprises at least five drag elements that are spaced equidistant along a length of said at least one cable between the upper and lower ends of said at least one cable.

10. The system according to claim 9, wherein a spacing between adjacent drag elements is less than eight times said effective radius.

11. The system according to claim 1, wherein said drag elements each have a center opening through which said at least one cable extends, and further comprising a plurality of support members secured to said at least one cable at spaced locations between the upper and lower ends of said at least one cable for engaging and supporting said drag elements at said spaced locations.

12. The system according to claim 11, wherein said support members are cable stops that are crimped or clamped to said at least one cable.

13. The system according to claim 1, wherein said drag elements comprise circular disks.

14. The system according to claim 13, wherein said circular disks each have a planar upper surface.

15. The system according to claim 1, wherein said drag elements are cap-shaped members each having a planar upper surface and a cylindrical sidewall.

16. The system according to claim 15, wherein each of said cap-shaped members further comprise a beveled transition area between said planar upper surface and said cylindrical sidewall.

17. The system according to claim 15, wherein each of said cap-shaped members has a hollow interior defined by said upper surface, said cylindrical sidewall, and an open bottom side.

18. A system for measuring a level of dry bulk material in a container, comprising:
at least one cable having an upper end and a lower end and adapted to be supported vertically within the container so as to be surrounded by the dry bulk material within the container;
a plurality of drag elements supported by said at least one cable at spaced locations between the upper and lower ends of said at least one cable, said drag elements each having a circular shape with a center and a radius from the center to an outer periphery of the circular shape; and
a load cell associated with said at least one cable, said load cell being arranged to measure a cumulative weight of said at least one cable and said drag elements plus the downward force applied by the dry bulk material in the container to the drag elements to provide a load cell output signal proportional to the level of dry bulk material in the container.

19. The system according to claim 18, wherein said drag elements each have a substantially flat horizontal surface on which said bulk material is captured to cause a downward force on the load cell.

20. The system according to claim 18, further comprising a plurality of support members secured to said at least one cable at spaced locations between the upper and lower ends of said at least one cable for engaging and supporting said drag elements at said spaced locations.

21. The system according to claim 18, wherein the radius of said drag element is less than 25% of a diameter of said container.

22. The system according to claim 18, wherein said drag elements each have a center opening through which said at least one cable extends, and further comprising a plurality of support members secured to said at least one cable at spaced locations between the upper and lower ends of said at least one cable for engaging and supporting said drag elements at said spaced locations.

23. The system according to claim 18, wherein said at least one cable comprises a plurality of vertical cables, and said drag elements each have a plurality of openings spaced from each other through which said plurality of vertical cables extend to support said drag elements at said spaced locations.

24. The system according to claim 18, wherein said dry bulk material has an angle of repose, and wherein a spacing between adjacent drag elements is greater than said radius times the tangent of said angle of repose.

25. The system according to claim 24, wherein said spacing between adjacent drag elements is less than eight times said radius.

* * * * *